United States Patent
Turski et al.

(10) Patent No.: US 6,401,853 B1
(45) Date of Patent: Jun. 11, 2002

(54) POWER-HOP RESPONSIVE ENGINE TORQUE CONTROL METHOD

(75) Inventors: Michael Paul Turski, Rochester Hills; Michael Douglas Rizzo, White Lake; Luke Sewell, Linden; Eric Edward Krueger, Ann Arbor; Vincent Marchese, White Lake; Loren Michael Trotter, Linden; Paul Stephen Zombory, Northville; Stephen William Smerika, Fenton, all of MI (US)

(73) Assignees: General Motors Corporation, Detroit; Delphi Technologies Inc., Troy, both of MI (US)

( * ) Notice: Subject to any disclaimer, the term of this patent is extended or adjusted under 35 U.S.C. 154(b) by 0 days.

(21) Appl. No.: 09/710,278

(22) Filed: Nov. 13, 2000

(51) Int. Cl.$^7$ ............................................... B60K 28/16
(52) U.S. Cl. ........................... 180/197; 180/284; 701/86
(58) Field of Search ................................. 180/197, 283, 180/284, 285; 701/53, 54, 74, 75, 86, 110, 111

(56) References Cited

U.S. PATENT DOCUMENTS

| | | | | |
|---|---|---|---|---|
| 5,117,934 A | * | 6/1992 | Tsuyama et al. | ............ 180/197 |
| 5,474,147 A | * | 12/1995 | Yesel et al. | ................. 180/197 |
| 5,636,121 A | * | 6/1997 | Tsuyama et al. | ....... 364/426.01 |
| 6,182,003 B1 | * | 1/2001 | Maier-Landgrebe | ......... 701/84 |
| 6,259,982 B1 | * | 7/2001 | Williams et al. | .............. 701/38 |

FOREIGN PATENT DOCUMENTS

JP          10-6731       * 1/1998

* cited by examiner

Primary Examiner—Avraham H. Lerner
(74) Attorney, Agent, or Firm—Christopher DeVries

(57) ABSTRACT

An improved engine torque control method uses existing powertrain sensors and controls to reliably detect and suppress power-hop with minimum degradation of vehicle acceleration. Power-hop is detected by identifying a characteristic wheel jerk magnitude and oscillation frequency based on driven wheel speeds. Once a power-hop condition is detected, the control method computes a desired engine torque output for suppressing the detected power-hop without unnecessarily degrading vehicle performance, based on the wheel jerk magnitude, the engine speed and vehicle acceleration. A combination of engine cylinder fuel cut-off and spark retard is then scheduled for reducing the engine output torque to the desired level for the duration of the power-hop condition. The control method has minimal impact on vehicle cost since it is performed (preferably) by engine or other control software, and has been shown to quickly and effectively suppresses power-hop and its disadvantages without significantly degrading vehicle performance.

8 Claims, 3 Drawing Sheets

POWER-HOP RESPONSIVE ENGINE TORQUE CONTROL METHOD

TECHNICAL FIELD

This invention relates to a torque control method for a vehicle engine, and more particularly to a control method for suppressing a detected power-hop condition while minimizing degradation of vehicle acceleration.

BACKGROUND OF THE INVENTION

Vehicles equipped with high torque engines, aggressive tires and lightweight driveline components can experience an undesired condition referred to as power-hop during a high torque vehicle launch. In general, power-hop is a condition of driveline instability initiated when the tractive effort decreases due to tire slip beyond an optimal slip value. If the engine torque is sufficiently high, the power-hop condition can be sustained, resulting in both torsional oscillation of the vehicle driveline and vertical oscillation of suspension members. Various techniques for suppressing power-hop include increasing driveshaft and half-shaft stiffness, decreasing tire aggressiveness, and equipping the driveline with dampers or auxiliary flywheels. However, each of these techniques increases cost and/or decreases performance. Accordingly, what is needed is a technique that effectively suppresses power-hop with minimal impact on vehicle cost and performance.

SUMMARY OF THE INVENTION

The present invention is directed to an improved engine torque control method that uses existing vehicle sensors and controls to reliably detect and suppress power-hop with minimum degradation of vehicle acceleration. Power-hop is detected by identifying a characteristic oscillation (magnitude and frequency) of the driven wheels. Once a power-hop condition is detected, the control method computes a desired engine torque output for suppressing the detected power-hop without unnecessarily degrading vehicle performance, based on the wheel oscillation magnitude, the engine speed and vehicle acceleration. A combination of engine cylinder fuel cut-off and spark retard is then scheduled for reducing the engine output torque to the desired level for the duration of the power-hop condition. The control method has minimal impact on vehicle cost since it is performed (preferably) by engine or other control software, and has been shown to quickly and effectively suppresses power-hop and its disadvantages without significantly degrading vehicle performance.

BRIEF DESCRIPTION OF THE DRAWINGS

FIG. 3 depicts a portion of the control method relating to detection of a power-hop condition; FIG. 4 depicts a portion of the control method relating to calculation of a desired torque output for suppressing a detected power-hop condition; and FIG. 5 depicts a portion of the control method relating to determination of engine fuel and spark controls for reducing the engine torque to the desired value.

DESCRIPTION OF THE PREFERRED EMBODIMENT

Figure 1:
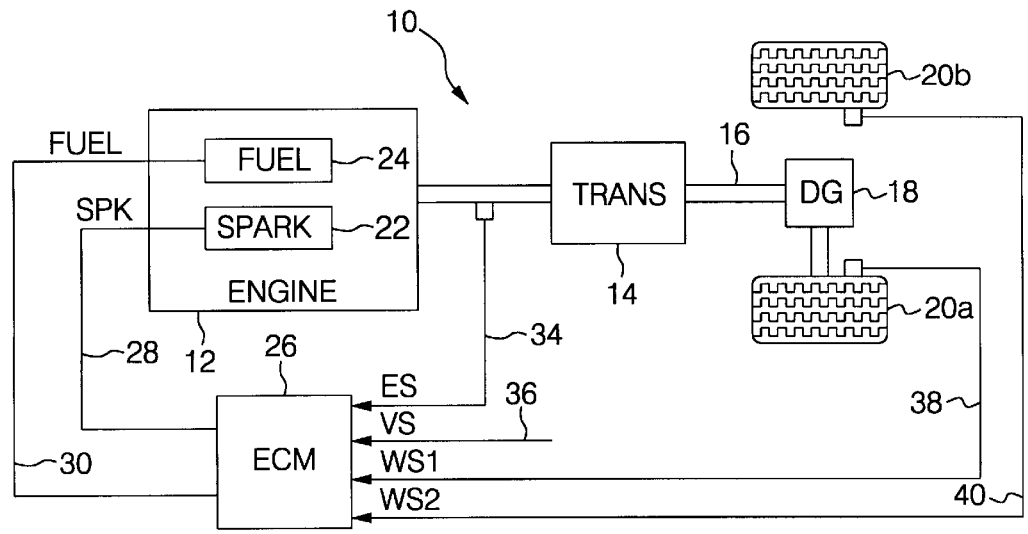
FIG. 1 is a schematic diagram of a vehicle powertrain, including an electronic control unit programmed to carry out the control method of this invention.

Referring to the drawings, and particularly to FIG. 1, the reference numeral 10 generally designates a vehicle drive train including an engine 12 coupled to a multiple-speed ratio transmission 14, which in turn is coupled via drive shaft 16 and differential gearset (DG) 18 to a pair of driven wheels 20a–20b. Engine 12 includes conventional spark and fuel control mechanisms 22, 24 operated under the control of an electronic control module (ECM) 26 via lines 28, 30 as indicated. The ECM 26 is microprocessor based, and operates in response to a number of inputs, including an engine speed signal ES on line 34 and a vehicle speed signal VS on line 36. Preferably, the vehicle speed signal VS is a true representation of vehicle speed, and may be obtained based on the speed of un-driven wheels, or from a vehicle anti-lock braking system (not shown). Additional inputs relevant to the control of this invention include the driven wheel speed signals WS1, WS2 on lines 38, 40, which signals may also be obtained from an anti-lock braking system. The ECM 26 carries out a number of conventional engine control and diagnostic algorithms, and according to this invention carries out an additional algorithm for monitoring the illustrated inputs to identify an oscillation of the driven wheels that is characteristic of a power-hop condition, and to adjust the engine fuel and spark controls in a manner to alleviate the power-hop condition without significantly degrading the vehicle performance. In the illustrated embodiment, the oscillation component of the respective driven wheel speeds WS1, WS2 is determined by twice differentiating the wheel speeds to form respective jerk signals. However, it will be recognized that the oscillation component may alternatively be obtained by suitable filtering of the wheel speeds WS1, WS2 or the corresponding wheel acceleration values ACCEL1, ACCEL2.

Figure 2:
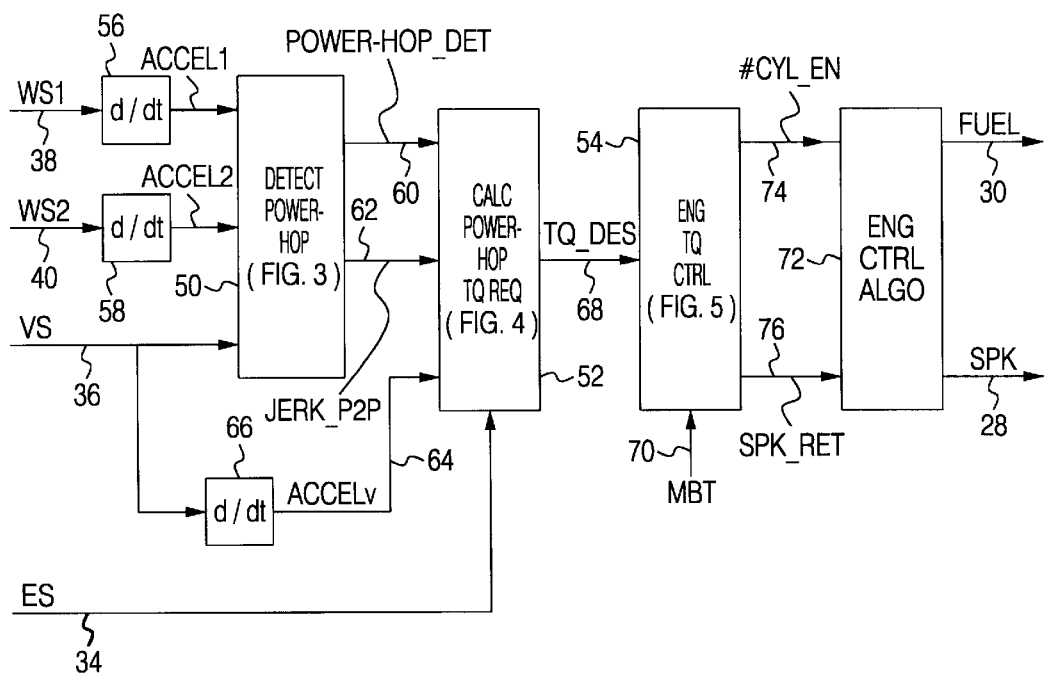
FIG. 2 is a block diagram of the control method of this invention.

The block diagram of FIG. 2 generally illustrates the control method of this invention as comprising three main portions, signified by the blocks 50, 52 and 54. The control portion signified by block 50 pertains to detection of a power-hop condition. The inputs to block 50 include the accelerations ACCEL1, ACCEL2 of the driven wheels 20a, 20b and the vehicle speed VS; in this regard, the blocks 56, 58 signify a differentiation function for obtaining the acceleration values ACCEL1, ACCEL2 from the respective wheel speed signals WS1, WS2. The outputs of block 50 include a POWER-HOP_DET flag on line 60 for indicating whether a power-hop condition is detected and a peak-to-peak jerk signal JERK_P2P on line 62 for indicating the severity of a detected power-hop condition. The control portion signified by block 52 is responsive to the outputs of block 50, and pertains to calculation of a desired engine torque for TQ_DES for suppressing a detected power-hop condition of the indicated magnitude. Additional inputs for block 52 include a vehicle acceleration signal ACCELv on line 64 and the engine speed signal ES on line 34, the block 66 signifying a differentiation function for developing the acceleration signal ACCELv based on the vehicle speed VS signal on line 36. The control portion signified by block 54 pertains to an engine torque control for quickly reducing the engine torque to a value corresponding to the TQ_DES signal on line 68, and is additionally responsive to the POWER-HOP_DET flag on line 60 and a model based torque (MBT) signal on line 70. The outputs of block 54 are applied to conventional engine control software residing within ECM 26 (signified by block 72), such outputs including the number of engine cylinders enabled for fuel control (#CYL_EN) and a spark retard variable (SPK_RET) on lines 74 and 76, respectively. As indicated in FIG. 2, the functionality of block 50, 52 and 54 are depicted in detail by the flow diagrams of FIGS. 3, 4 and 5, respectively.

Figure 3:
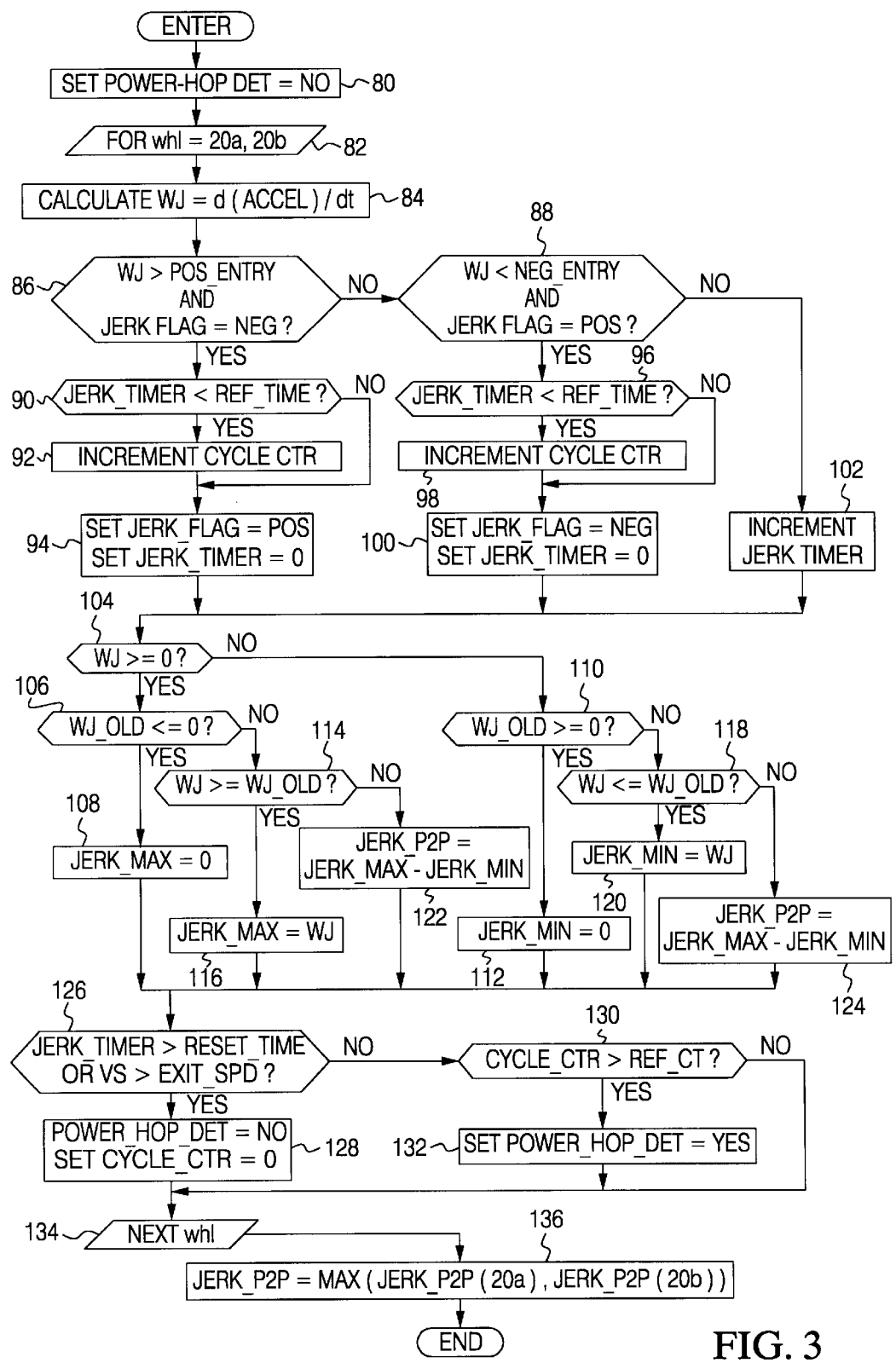
FIGS. 3, 4 and 5 are flow diagrams representative of computer program instructions executed by the electronic control unit of FIG. 1 in carrying out the control method of FIG. 2.

Referring to the flow diagram of FIG. 3, it will be seen that power-hop is detected according to this invention when a characteristic wheel jerk oscillation is identified. As such, the detection routine of FIG. 3 is periodically executed at a given rate to sample and process the wheel speed signals WS1, WS2. The signal processing utilizes a number of flags and variables, including the POWER-HOP_DET flag, a flag JERK_FLAG to indicate if the wheel jerk is in a positive or negative cycle, a timer JERK_TIMER to measure the elapsed time between wheel jerk oscillation cycles, a counter CYCLE_CTR to count the number of positive and negative wheel jerk cycles, and variables JERK_MAX and JERK_MIN to track the peak positive and negative wheel jerk values.

The POWER-HOP_DET flag is initially set to NO at each execution of the detection routine, as indicated at block 80, and the blocks 84–132 are then executed for each of the driven wheels 20a, 20b, as indicated by the FOR, NEXT blocks 82, 134 to compute peak-to-peak jerk values JERK_P2P(20a), JERK_P2P(20b) for each drive wheel 20a, 20b. Thereafter, the block 136 computes the jerk magnitude JERK_P2P according to the maximum of the individual peak-to-peak jerk values JERK_P2P(20a) and JERK_P2P(20b).

Referring to block 84, a wheel jerk signal WJ is computed by differentiating the respective wheel acceleration signal (ACCEL1 or ACCEL2). The blocks 86 and 88 are then executed to detect a change in polarity (in excess of minimum magnitudes POS_ENTRY and NEG_ENTRY) of the computed wheel jerk signal WJ, based on the status of JERK_FLAG and the current polarity of WJ. At each negative-to-positive transition, block 86 is answered in the affirmative, and blocks 90, 92, 94 are executed to increment CYCLE_CTR so long as the time denoted by JERK_TIMER is less than a predetermined reference time REF_TIME, to reverse the state of JERK_FLAG, and to set JERK_TIMER to zero. In a similar manner, block 88 is answered in the affirmative at each positive-to-negative transition of WJ, in which case blocks 96, 98, 100 are executed to increment CYCLE_CTR so long as the time denoted by JERK_TIMER is less than REF_TIME, to reverse the state of JERK_FLAG, and to set JERK_TIMER to zero. If a polarity transition of WJ does not occur, blocks 86 and 88 are answered in the negative, and block 102 is executed to increment JERK_TIMER. Thus, it will be seen that the entry magnitudes POS_ENTRY, NEG_ENTRY define the minimum characteristic jerk magnitude of power-hop, while the timer JERK_TIMER defines the minimum characteristic jerk oscillation frequency of power-hop.

The blocks 104–106, 110, 114 and 118 compare the current wheel jerk value WJ to the wheel jerk value (WJ_OLD) for the same wheel computed in the previous execution of the power-hop detection routine. In the event of a negative-to-positive transition, blocks 104 and 106 will be answered in the affirmative, and block 108 is executed to reset JERK_MAX to zero. Similarly, blocks 104 and 110 detect a positive-to-negative transition, in which case, block 112 resets JERK_MIN to zero. If the polarities of WJ and WJ_OLD are both positive, and WJ is more positive than WJ_OLD, as detected by blocks 104, 106 and 114, block 116 is executed to set JERK_MAX equal to WJ. Similarly, if the polarities of WJ and WJ_OLD are both negative, and WJ is more negative than WJ_OLD, as detected by blocks 104, 110 and 118, block 120 is executed to set JERK_MIN equal to WJ. In this way, JERK_MAX tracks WJ when WJ is positive and increasing, and JERK_MIN tracks WJ when WJ is negative and decreasing. The blocks 104, 106 and 114 also detect when WJ is positive but decreasing; in such case, the peak positive value of WJ is stored in JERK_MAX, and block 122 is executed to compute the peak-to-peak jerk JERK_P2P for the respective wheel 20a, 20b according to the difference (JERK_MAX–JERK_MIN). Similarly, the blocks 104, 110 and 118 also detect when WJ is negative but increasing; in such case, the peak negative value of WJ is stored in JERK_MIN, and block 124 is executed to compute the peak-to-peak jerk JERK_P2P according to the difference (JERK_MAX–JERK_MIN).

The block 126 defines exit criteria for power-hop detection by comparing JERK_TIMER and vehicle speed VS to respective thresholds RESET_TIME and EXIT_SPD. The event criteria are satisfied if JERK_TIMER exceeds RESET_TIME or VS exceeds EXIT_SPD, in which case block 128 sets the POWER-HOP_DET flag to NO and sets CYCLE_CTR to zero. If the exit criteria are not satisfied, block 130 compares CYCLE_CTR to a reference count RE_FCT. If CYCLE_CTR exceeds REF_CT, a power-hop condition is detected, and block 132 is executed to set the POWER-HOP_DET flag to YES. Thus, the POWER-HOP_DET flag is set to indicate a power-hop condition when a characteristic oscillation is observed in either of the drive wheels 20a or 20b.

Figure 4:
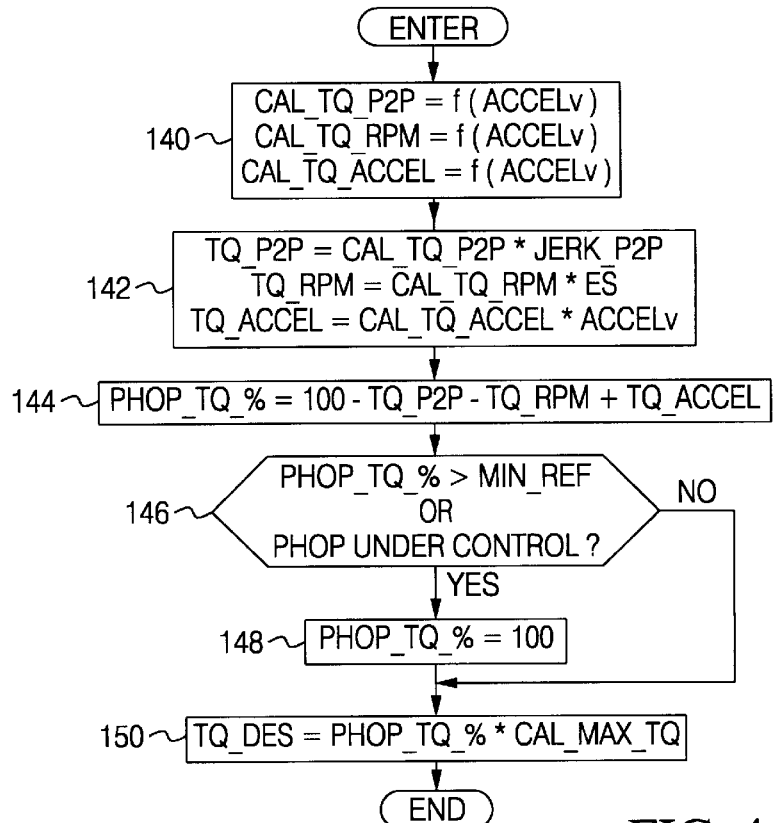
Figure 5:
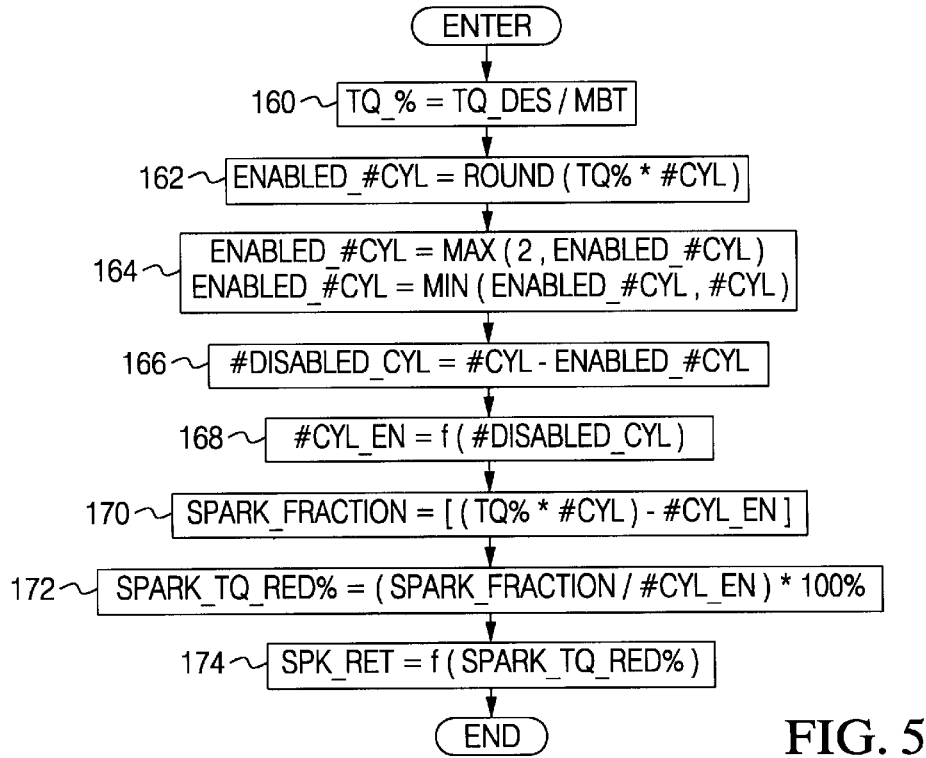

As indicated above, the functionality of calculating and implementing the power-hop torque request (blocks 52 and 54 of FIG. 2) is detailed in the flow diagrams of FIGS. 4 and 5, respectively. Thus, whenever a power-hop condition is detected—that is, when the status of the POWER-HOP_DET flag is YES—software routines corresponding to the flow diagram blocks of FIGS. 4 and 5 are periodically executed to determine the appropriate inputs for the engine control algorithm software, designated by block 72 in FIG. 2.

Referring to FIG. 4, the blocks 140–142 are first executed to compute three torque terms: TQ_P2P, TQ_RPM and TQ_ACCEL. The term TQ_P2P is determined according to the product of the wheel jerk magnitude (JERK_P2P) from block 136 of FIG. 3 and a vehicle acceleration dependent constant, CAL_TQ_P2P. The term TQ_RPM is determined according to the product of the engine speed ES and a vehicle acceleration dependent constant, CAL_TQ_RPM, and the term TQ_ACCEL is determined according to the product of the vehicle acceleration ACCELv and a vehicle acceleration dependent constant, CAL_TQ_ACCEL. The constants CAL_TQ_P2P, CAL_TQ_RPM, CAL_TQ_ACCEL are determined by table look-up as a function of vehicle acceleration (ACCELv), and serve to convert the respective jerk, speed and acceleration terms into corresponding torque loss/gain quantities associated with the detected power-hop condition. The torque terms TQ_P2P, TQ_RPM and TQ_ACCEL are then combined at block 144 to determine the desired engine output torque PHOP_TQ_% as a percentage of the maximum output torque (i.e., 100%). Referring to block 144, it will be seen that the terms TQ_P2P and TQ_RPM reduce PHOP_TQ_%, while the term TQ_ACCEL increases PHOP_TQ_%. That is, PHOP_TQ_% decreases with increasing power-hop severity and with increasing engine speed, but increases with increasing vehicle acceleration. This serves, along with the calibration values determined at block 140, to tailor PHOP_TQ_% so that the power-hop condition is curtailed while sustaining (as much as possible) the vehicle acceleration level. If the calculated PHOP_TQ_% is greater than a reference MIN_REF such as 95%, as determined at block 146, the power-hop condition is not sufficiently severe to warrant engine torque reduction, and the block 148 is executed to set PHOP_TQ_% equal to 100%. Blocks 146–148 similarly prevent the engine torque reduction if it is determined that the power-hop condition is under control, meaning that the measured severity of the power-hop condition is decreasing (dampening). Finally, block 150 is executed to determine an engine output torque value TQ_DES corresponding to PHOP_TQ_% according to the product (PHOP_TQ_% * CAL_MAX_TQ), where CAL_MAX_TQ is a calibrated value representing the maximum engine output torque, in N-m for example.

Referring to FIG. 5, the blocks 160–174 are executed in sequence as shown to convert the desired torque TQ_DES into corresponding fuel cut-off and spark retard control signals #CLY_EN, SPK_RET. In general, the routine determines the minimum number of engine cylinders #CLY_EN required to produce TQ_DES, and then determines a spark timing retardation value SPK_RET for reducing the produced torque to TQ_DES. First, block 160 converts TQ_DES to a percentage TQ_% of a model-based representation MBT of the current engine torque with normal fueling being delivered to each of the engine cylinders. Block 162 then determines the minimum number of engine cylinders (ENABLED_#CYL) required to achieve TQ_%; this is achieved by rounding up the product (TQ_% * #CYL), where #CYL is the total number of engine cylinders. Block 164 limits ENABLED_#CYL to be at least two, but no more than #CYL, and block 166 computes the corresponding number of disabled cylinders, #DISABLED_CYL. The block 168 then determines the output #CYL_EN by table look-up as a function of #DISABLED_CYL to satisfy driveability concerns. Blocks 170–174 then determine how much spark retard is required to achieve the torque reduction not obtained by disabling cylinder fueling. At block 170, the additional torque reduction to be achieved by spark retard (SPARK_FRACTION) is computed according to the difference between #CYL_EN and the product (TQ% * #CYL). Block 172 expresses SPARK_FRACTION as a percentage of torque reduction per enabled (fueled) cylinder (SPARK_TQ_RED%), and block 174 determines a corresponding amount of spark retard (SPK_RET) by table look-up. As indicated above, the computed values of #CYL_EN and SPK_RET are subsequently used by the engine control algorithm software (block 72 of FIG. 2) to correspondingly control the engine spark and fuel control mechanisms 22, 24.

In summary, the control of this invention provides a practical and cost-effective solution for suppressing power-hop. The control is enabled when a characteristic driven wheel oscillation is identified, and torque reduction is scheduled based on the severity of the power-hop to ensure that the detected power-hop is suppressed without significantly affecting vehicle performance. Additionally, the torque is reduced with a combination of engine cylinder fuel cut-off and spark retard so that the suppression occurs quickly and accurately. While described in reference to the illustrated embodiment, it is expected that various modifications in addition to those mentioned above will occur to those skilled in the art. In this regard, it will be understood that the scope of this invention is not limited to the illustrated embodiment, and that control methods incorporating such modifications may fall within the scope of this invention, which is defined by the appended claims.

What is claimed is:

1. A torque control method for a motor vehicle engine coupled to rotatably drive a pair of wheels, the control method comprising the steps of:

measuring rotational speeds of said wheels, and determining an oscillation component of such measured speeds;

detecting a power-hop condition when the oscillation component of at least one of said wheels has a magnitude that exceeds a predetermined magnitude threshold and a frequency that exceeds a predetermined frequency threshold;

in response to a detected power, reducing an output torque of said engine from a maximum value to a computed torque value based on the magnitude of said oscillation component and an acceleration of said vehicle so as to suppress the detected power-hop condition without significantly reducing the acceleration of said vehicle; and wherein the step of determining an oscillation component of the measured wheel speeds includes the step of twice differentiating the measured wheel speeds to determine jerk values for said wheels.

2. The torque control method of claim 1, wherein an oscillation component and its magnitude are determined for each of said wheels, and said computed torque value is based on the higher of such determined oscillation magnitudes.

3. The torque control method of claim 1, wherein the magnitude of said oscillation component is obtained by determining a peak-to-peak magnitude of the jerk value determined for at least one of said wheels.

4. The torque control method of claim 1, including the step of:

returning the output torque of the engine to said maximum value when a speed of said vehicle exceeds a predetermined threshold.

5. The torque control method of claim 1, including the step of:

inhibiting the reduction of engine output torque if a difference between the computed torque value and said maximum value is less than a reference torque.

6. The torque control method of claim 1, wherein said computed torque value decreases with increasing torque component magnitude and increases with increasing vehicle acceleration.

7. A torque control method for a motor vehicle engine coupled to rotatably drive a pair of wheels, the control method comprising the steps of:

measuring rotational speeds of said wheels, and determining an oscillation component of such measured speeds;

detecting a power-hop condition when the oscillation component of at least one of said wheels has a magnitude that exceeds a predetermined magnitude threshold and a frequency that exceeds a predetermined frequency threshold;

in response to a detected power-hop condition, reducing an output torque of said engine from a maximum value to a computed torque value based on the magnitude of said oscillation component and an acceleration of said vehicle so as to suppress the detected power-hop condition without significantly reducing the acceleration of said vehicle; and inhibiting the reduction of engine output torque if it is determined that the magnitude of said oscillation component is dampening.

8. A torque control method for a motor vehicle engine coupled to rotatably drive a pair of wheels, the control method comprising the steps of:

measuring rotational speeds of said wheels, and determining an oscillation component of such measured speeds;

detecting a power-hop condition when the oscillation component of at least one of said wheels has a magnitude that exceeds a predetermined magnitude threshold and a frequency that exceeds a predetermined frequency threshold;

in response to a detected power-hop condition, reducing an output torque of said engine from a maximum value to a computed torque value based on the magnitude of said oscillation component and an acceleration of said vehicle so as to suppress the detected power-hop condition without significantly reducing the acceleration of said vehicle; and wherein said engine is a multi-cylinder internal combustion engine having fuel delivery and spark timing controls, and the step of reducing the output torque of said engine includes the steps of enabling fuel delivery to a minimum number of engine cylinders needed to achieve said computed torque value and retarding spark timing in an amount to reduce said output torque to said computed value with said minimum number of engine cylinders.

* * * * *